United States Patent
Wang

(10) Patent No.: US 11,865,799 B2
(45) Date of Patent: Jan. 9, 2024

(54) LAMINATED SWITCHABLE PANEL AND METHODS FOR MAKING AND USING

(71) Applicant: Scienstry, Inc., Richardson, TX (US)

(72) Inventor: Jiansheng Wang, The Colony, TX (US)

(73) Assignee: Scienstry, Inc., Richardson, TX (US)

( * ) Notice: Subject to any disclaimer, the term of this patent is extended or adjusted under 35 U.S.C. 154(b) by 0 days.

(21) Appl. No.: 17/452,333

(22) Filed: Oct. 26, 2021

(65) Prior Publication Data
US 2022/0040942 A1   Feb. 10, 2022

Related U.S. Application Data

(62) Division of application No. 14/711,882, filed on May 14, 2015, now Pat. No. 11,220,076.

(60) Provisional application No. 62/176,410, filed on Feb. 19, 2015.

(51) Int. Cl.
| B29D 11/00 | (2006.01) |
| G02F 1/01 | (2006.01) |
| B32B 17/10 | (2006.01) |
| G02F 1/1334 | (2006.01) |
| B29K 105/20 | (2006.01) |
| B29K 709/08 | (2006.01) |
| B32B 38/00 | (2006.01) |

(52) U.S. Cl.
CPC ...... *B29D 11/0073* (2013.01); *B32B 17/1077* (2013.01); *B32B 17/10467* (2013.01); *B32B 17/10477* (2013.01); *B32B 17/10504* (2013.01); *B32B 17/10513* (2013.01); *B32B 17/10532* (2013.01); *B32B 17/10651* (2013.01); *B32B 17/10706* (2013.01); *B32B 17/10733* (2013.01); *B32B 17/10743* (2013.01); *B32B 17/10779* (2013.01); *B32B 17/10798* (2013.01); *B32B 17/10917* (2013.01); *G02F 1/0147* (2013.01); *G02F 1/1334* (2013.01); *B29K 2105/20* (2013.01); *B29K 2709/08* (2013.01); *B32B 2038/0076* (2013.01); *B32B 2310/0831* (2013.01); *B32B 2315/08* (2013.01); *B32B 2457/202* (2013.01)

(58) Field of Classification Search
CPC .......... B29D 11/0073; B32B 17/10467; B32B 17/10477; B32B 17/10504; B32B 17/10513; B32B 17/10532; B32B 17/10651; B32B 17/10706; B32B 17/10733; B32B 17/10743; B32B 17/1077; B32B 17/10779; B32B 17/10798; B32B 17/10917; B32B 2038/0076; B32B 2310/0831; B32B 2315/08; B32B 2457/202; G02F 1/0147; G02F 1/1334; B29K 2105/20; B29K 2709/08
See application file for complete search history.

(56) References Cited

U.S. PATENT DOCUMENTS

| 4,435,047 A | 3/1984 | Fergason |
| 4,605,284 A | 8/1986 | Fergason |
| 4,685,771 A | 8/1987 | West et al. |
| 4,688,900 A | 8/1987 | Doane et al. |

(Continued)

*Primary Examiner* — Nathanael R Briggs
(74) *Attorney, Agent, or Firm* — Fish & Richardson P.C.

(57) ABSTRACT

Method and composition for switchable panels are disclosed. Switchable films are placed between glass and liquid resin is injected between the glass and cured. The panels may be used for a wide variety of applications.

12 Claims, 8 Drawing Sheets

(56) References Cited

U.S. PATENT DOCUMENTS

| | | | |
|---|---|---|---|
| 4,707,080 A | 11/1987 | Fergason | |
| 5,270,843 A | 12/1993 | Wang | |
| 9,354,513 B2 | 5/2016 | Flaum | |
| 9,701,577 B1 * | 7/2017 | Simmons | C03C 17/366 |
| 11,220,076 B2 | 1/2022 | Wang | |
| 2001/0036515 A1 | 11/2001 | Kuo et al. | |
| 2011/0194058 A1 | 8/2011 | Amos et al. | |
| 2013/0308076 A1 | 11/2013 | Yasumatsu | |
| 2014/0023881 A1 | 1/2014 | Sakaguchi et al. | |
| 2014/0078410 A1 * | 3/2014 | Wang | G03B 21/16 349/5 |
| 2014/0347619 A1 * | 11/2014 | Wada | G02F 1/1341 349/157 |
| 2015/0000823 A1 * | 1/2015 | Kim | B32B 37/1284 156/80 |
| 2015/0086794 A1 * | 3/2015 | Akita | B32B 9/00 156/247 |
| 2015/0275090 A1 | 10/2015 | Wang | |
| 2015/0301367 A1 | 10/2015 | Mennig | |
| 2016/0207289 A1 | 7/2016 | Dawson-Elli et al. | |
| 2016/0243773 A1 | 8/2016 | Wang | |

\* cited by examiner

LAMINATED SWITCHABLE PANEL AND METHODS FOR MAKING AND USING

This application is a divisional application of U.S. Application No. 14/711,882, filed May 14, 2015, which claims priority to U.S. Provisional Patent Application No. 62/176,410 filed on Feb. 19, 2015, the entire contents of each of which are hereby incorporated by reference in their entirety.

BACKGROUND OF INVENTION

1. Field of the Invention

The present disclosure is directed toward methods for making switchable panels using cast or roller lamination and the resulting panels having Liquid Crystal MicroDroplet (LCMD) films or other switchable films.

2. Description of Related Art

A "switchable film" is a relatively thin (normally less than 2 mm) material that can change optical properties in response to an electrical or thermal stimulus applied to the film. A common type of switchable film is a Liquid Crystal Micro-Droplet (LCMD) film. In this type of film, liquid crystal (LC) material is contained in microdroplets embedded in a solid polymer matrix. Birefringence of the liquid crystal results from the material having a different index of refraction in different directions. The extraordinary index of refraction ($n_e$) of a liquid crystal molecule is defined as that measured along the long axis of the molecule, and the ordinary index of refraction ($n_o$) is measured in a plane perpendicular to the long axis. The dielectric anisotropy of liquid crystals is defined as $\Delta\varepsilon=\varepsilon_\parallel-\varepsilon_\perp$, where $\varepsilon_\parallel$ and $\varepsilon_\perp$, are parallel and perpendicular dielectric constants, respectively. Liquid crystals having a positive dielectric anisotropy ($\Delta\varepsilon>0$) are called positive-type liquid crystals, or positive liquid crystals, and liquid crystals having a negative dielectric anisotropy ($\Delta\varepsilon<0$) are called negative-type liquid crystals, or negative liquid crystals. The positive liquid crystals orient in the direction of an electric field, whereas the negative liquid crystals orient perpendicular to an electric field. These electro-optical properties of liquid crystals have been widely used in various applications.

One approach to obtaining dispersed microdroplets in a polymer matrix is the method of encapsulating or emulsifying the liquid crystals and suspending the liquid crystals in a liquid that is polymerized to form a solid. This approach is described, for example, in U.S. Pat. Nos. 4,435,047; 4,605,284; and 4,707,080. This process includes mixing positive liquid crystals and encapsulating material, in which the liquid crystals are insoluble, and permitting formation of discrete capsules containing the liquid crystals. The emulsion is cast on a substrate, which is precoated with a transparent electrode, such as an indium tin oxide (ITO) coating, to form an encapsulated liquid crystal device.

LCMD displays may also be formed by phase separation of low-molecular weight liquid crystals from a prepolymer or polymer solution to form microdroplets of liquid crystals. This process, described in U.S. Pat. Nos. 4,685,771 and 4,688,900 includes dissolving positive liquid crystals in an uncured resin and then sandwiching the mixture between two substrates which are precoated with transparent electrodes. The resin is then cured so that microdroplets of liquid crystals are formed and uniformly dispersed in the cured resin to form a polymer-dispersed liquid crystal device. When an AC voltage is applied between the two transparent electrodes, the positive liquid crystals in microdroplets are oriented and the display is transparent if the refractive index of the polymer matrix ($n_p$) is made to equal the ordinary index of liquid crystals ($n_o$). The display scatters light in the absence of the electric field, because the directors (vector in the direction of the long axis of the molecules) of the liquid crystals are random and the refractive index of the polymer cannot match the index of the liquid crystals. Nematic liquid crystals having a positive dielectric anisotropy ($\Delta\varepsilon>0$), large $\Delta n$, which, may contain a dichroic dye mixture, can be used to form a transparent and absorbing mode.

LCMD displays may be characterized as normal mode or reverse mode displays. A normal mode display containing liquid crystals is non-transparent (scattering or absorbing) in the absence of an electric field and is transparent in the presence of an applied electric field. A reverse mode display is transparent in the absence of an electric field and is non-transparent (scattering or absorbing) in the presence of an applied electric field.

If an electric field is applied to a LCMD display, liquid crystals in microdroplets are not entirely perpendicular to the substrate. The central part of liquid crystals in the droplets is clear if the refractive index of the polymer matches the ordinary refractive index of the liquid crystals ($n_o$). However, liquid crystals near the ends of the microdroplet are strongly bent because they are parallel to the skin of the inner layer. They are, therefore, tilted to the substrate surface, and the refractive index of the liquid crystals cannot match with the refractive indexes of the polymer matrix and inner layer. Therefore, parts of the liquid crystal droplets scatter light and produce haze.

There existed a need for devices that use improved LCMD technologies in projection systems that provide improved diffusion and provide for a wide viewing angle. These functions were achieved with an improved scattering mechanism using, for example, a non-linear optical matrix system.

Other types of switchable films include Suspended Particle Display (SPD) film, electrochromic film and thermochromic film. These films may be also used to make various Liquid Resin Laminated Switchable Panel (LRLSP) by using the same methods and processes described in this disclosure to have durable structure and switching functions, since these films have a similar structure to LCMD film. The only difference is a different center layer, as described below. Suspended Particle Display and Electrochromics films are also laminated between two ITO-coated plastic films, such as PET film, and switched by an electric voltage. Thermochromic film is not driven by an electric voltage and does not have ITO layers in a cell structure; it changes its transmittance with different temperatures. The major difference of these films from an LCMD film is the center layer. Since cast lamination and roller lamination do not directly deal with material of the center layer and all surfaces of these films may be the same as a surface of LCMD film (PET, for example), these films may be treated the same as an LCMD film in cast lamination and roller lamination.

SPD film is a thin film in which rod-like nano-scale particles suspended in a liquid am laminated between two layers of ITO-coated film. When no voltage is applied, the suspended particles are randomly organized, thus blocking and absorbing light. When voltage is applied, the suspended particles align and let light pass. Varying the voltage of the film varies the orientation of the suspended particles, thereby regulating the tint of the glazing and the amount of light transmitted. SPD film is commercially available from Hitachi Chemical of Ibaraki, Japan, Vision Systems of Melbourne, Florid, US, Isoclima of Mexicali, Mexico and Isoclima of Padua, Italy.

Electrochromic film is a thin layer of electrochromic material laminated between two layers of ITO coated film. The electrochromic material changes between a colored, translucent state (usually blue) and a transparent state. A burst of electricity is required for changing its opacity, but once the change has been effected, no electricity is needed for maintaining the particular shade which has been reached. Electrochromic device film is commercially available from SAGE of Minnesota, US and View Co. of Olive Branch, Mississippi, US.

Thermochromic film is a thin film in which thermochromic material is laminated between two pieces of polymer film. The thermochromic material changes its transmittance with temperature. Thermochromic device film may allow sunlight or solar radiation into a building when the ambient temperature is low and substantially block solar radiation when the ambient temperature is high, especially when sunlight is directly on the window. Thermochromic device film is commercially available from Ravenbrick of Denver, US and Pleotint of Michigan, US.

Glass lamination is a common process to make panels more durable and safer. Lamination with an interlayer plastic sheet is a common method of making laminated glass. Bent or tempered glass normally is difficult to be used in interlayer lamination, because of the lack of required flatness. Interlayer-laminated switchable panel is commonly used as "privacy glass." Some cast lamination utilizing a UV- or heat-curing mechanism is also used to make cast laminated clear glass panel.

BRIEF SUMMARY OF THE INVENTION

The embodiments of the invention are listed by the claims that follow the description.

In one embodiment, a panel apparatus comprises a glass layer, an LCMD film and an interlayer polymerized from a liquid resin within the panel. A cast method and a roller method of making the apparatus are disclosed. A method of improving thermal efficiency of a window using the apparatus is also disclosed.

Additional aspects, features, and advantages of the present disclosure will become apparent from the following detailed description.

BRIEF DESCRIPTION OF THE SEVERAL VIEWS OF THE DRAWING(S)

DETAILED DESCRIPTION OF THE INVENTION

Figure 1:
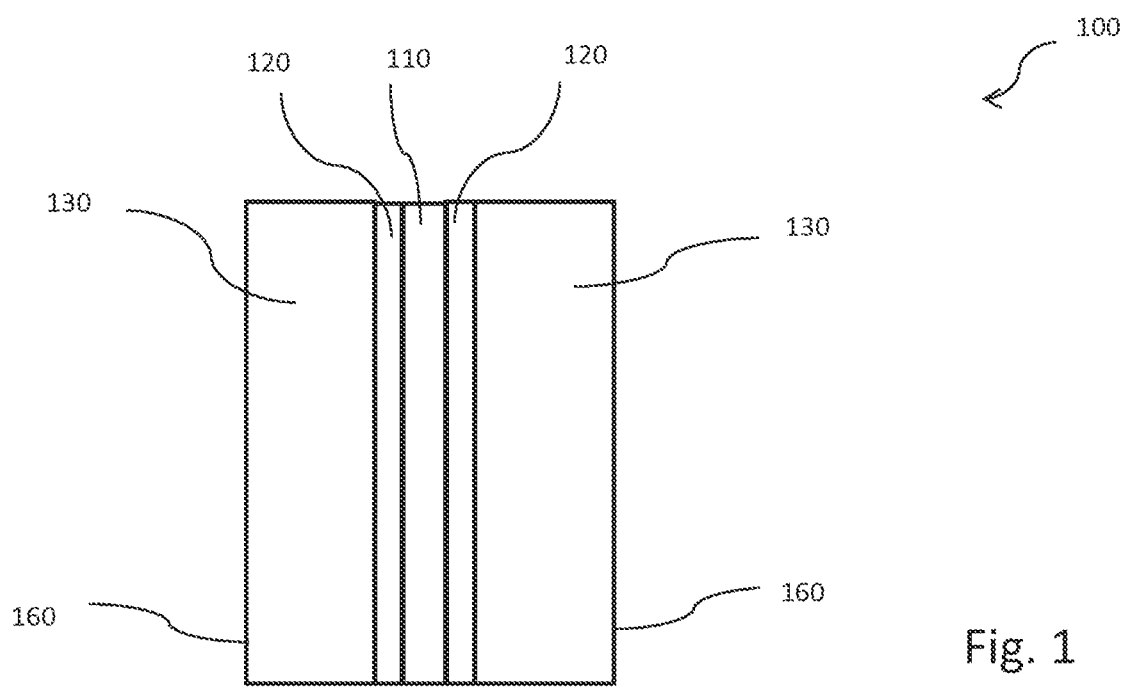
FIG. 1 is a cross-sectional view of an LCMD film structure according to an embodiment of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments anchor configurations discussed.

As used herein the term "LCMD device" or "LCMD film" or "LCMD display" means a device or film or display, respectively, formed using various classes of polymer films containing liquid crystal material. For example, an LCMD device may be formed using nematic curvilinear aligned phase (NCAP) films, such as material and devices described in U.S. 4,435,047 filed Sep. 16, 1981 disclosing "Encapsulated Liquid Crystal and Method," which is incorporated by reference herein in its entirety. An LCMD device may also be formed using polymer dispersed liquid crystal (PDLC) films formed using phase separation in a homogenous polymer matrix, such as material and devices described in U.S. Pat. No. 4,688,900 filed Sep. 17, 1985 disclosing "Light Modulating Material Comprising a Liquid Crystal Dispersion in a Plastic Matrix," which is incorporated by reference herein in its entirety. An LCMD device may also be formed using a non-homogenous polymer dispersed liquid crystal display (NPD-LCD) formed using a non-homogenous light transmissive copolymer matrix with dispersed droplets of liquid crystal material, such as material and devices described in U.S. Pat. No. 5,270,843 filed Aug. 31, 1992 disclosing "Directly Formed Polymer Dispersed Liquid Crystal Light Shutter Displays," which is incorporated by reference herein in its entirety. Other forms of liquid crystal microdroplet films may also be suitable. A NPD-LCD device may be configured in one of two modes. In a positive mode, an NPD-LCD device is switchable between an opaque state without an applied electrical voltage and clear state with an applied electrical voltage. In a negative mode, an NPD-LCD device is switchable between a clear state without an applied electrical voltage and an opaque state with an applied electrical voltage.

For better durability, LCMD film is often laminated into two pieces of glass by using interlayer, a soft film material which may have an adhesion function when melted at a high temperature. Interlayer is a thermoplastic material that may be used to bond glass or plastic or film together through a high-temperature process, called interlayer lamination. Sometime, both interlayer material or interlayer film before used in a lamination and an internal layer formed with the interlayer material after a lamination process are called "interlayer" in the glass industry. Such interlayer laminated LCMD panel may be used as privacy glass or projection panel.

As used herein, the terms "cast lamination" or "roller lamination" or "liquid resin lamination" means a lamination process using liquid resin added into the space between two pieces of glass resulting in seamless laminated glass. An LCMD film may be sandwiched between two layers of glass, and the resulting panel is called "cast laminated", "roller laminated" or "resin laminated" LCMD panel.

As used herein, the terms "switchable panel", "cast laminated switchable panel (CLSP)," or "roller laminated switchable panel (RLSP)" or "liquid resin laminated switchable panel (LRLSP)" (or "smart glass") means a device or panel component formed of at least one layer of a transparent material such as glass or a polymer material together with at least one layer of LCMD film (or other non-liquid-crystal switchable films). As used herein, the term "glass" is understood to include traditional silica-based glass as well as polymer-based transparent materials, such as acrylic glass and polycarbonate glass, which have a relatively rigid planar or curved format. Glass may be colored or include tinting. Glass may also include annealed, reinforced, toughened and laminated glasses or any other type of transparent material having higher strength, safety or other special features, such as self-cleaning. Glass may also have anti-reflective coating or anti-glare coatings on it.

As used herein, the terms "liquid resin" means a liquid resin which may be polymerized to form a transparent solid. Liquid resin includes acrylic resin, methacrylate resin, urethane resin, silicone resin, polyester resin, epoxy resin and polysulfide resin.

Referring to FIG. 1, a cross-sectional view of one example of an LCMD film 100 is illustrated. LCMD film structure 100 includes a LC-polymer (matrix) layer 110, transparent and conductive coating 120 (e.g., an indium tin oxide (ITO) coating) and a transparent plastic film 130, such as polyester film or polycarbonate film, and surface 160 of film 130. Although LCMD film is used in this discussion, it should be understood that other switchable films, such as suspended particle display (SPD) film and electrochromic film and thermochromic film having a transparent plastic film such as film 130 may be used in place of LCMD film.

Figure 2:
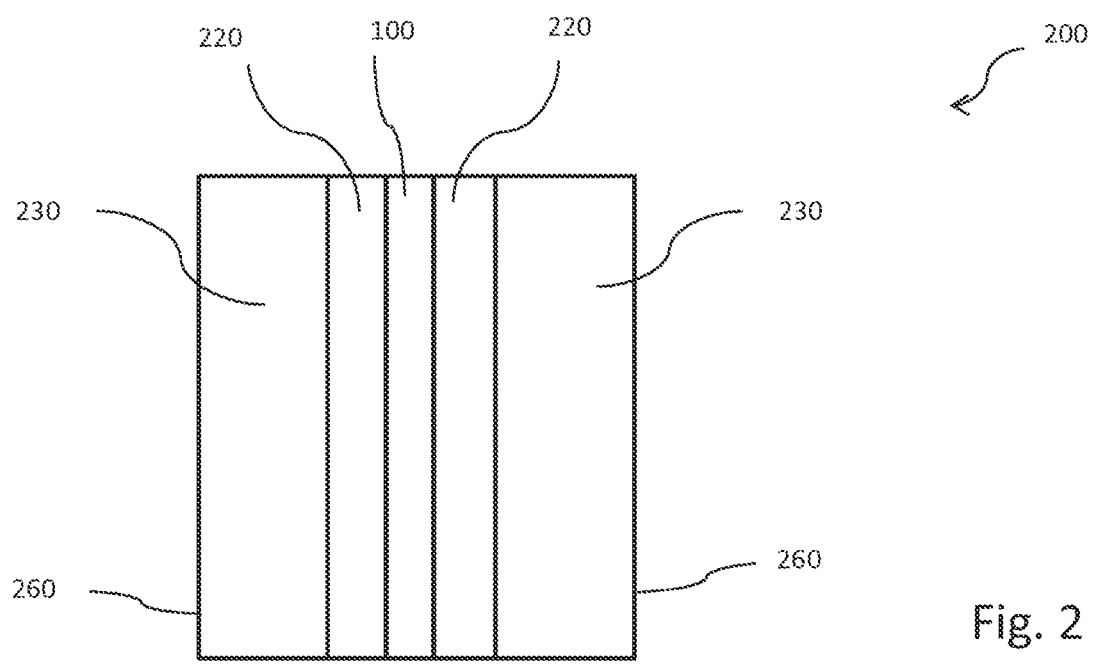
FIG. 2 is a cross-sectional view of an interlayer-laminated LCMD panel according to an embodiment of the present disclosure.

FIG. 2 is a cross-sectional view of one example of an interlayer laminated LCMD panel 200. LCMD film 100 is laminated between two layers of glass 230 with an adhesive interlayer 220. The interlayer material may include, for example, polyvinyl butyral (PVB), ethylene vinyl acetate (EVA), and/or thermoplastic polyurethane (TPU). Glass surface 260 may be an air-solid interface. As used herein, the term "laminated panel" refers to layered structures in which the LCMD film or other switchable films and one or more layers of glass are separated by an adhesive interlayer extending across substantially the entire interface between the LCMD film and the glass.

Figure 3:
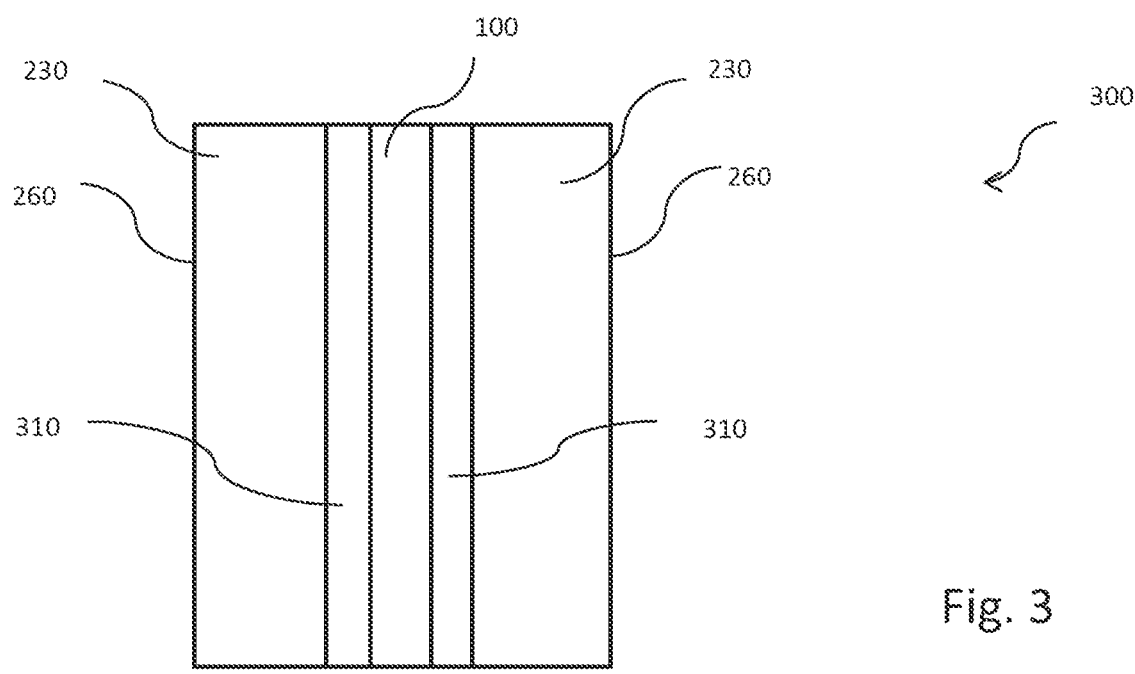
FIG. 3 is a cross-sectional view of a liquid resin laminated switchable panel (LRLSP) apparatus according to one or more embodiments of the present disclosure.

FIG. 3 is a cross-sectional view of one example of a cast laminated switchable panel or roller laminated switchable panel apparatus 300, or collectively called liquid resin laminated switchable panel or LRLSP. The apparatus 300 includes an LCMD film 100 positioned between two layers of glass 230. A cured or partially cured resin layer 310 is bonding to outside surface 160 of LCMD film 100 and inside surface of glass 260. However, other configurations and inclusion or omission of the apparatus 300 may be possible. The terms "laminating" and "resin laminating" are understood to include creating a solid or semi-solid layer between the glass 230 and the LCMD film 100 or between two layers of glass. "Liquid resin lamination" includes cast lamination and roller lamination. For example, liquid resin, such as an acrylic system or polyurethane system or epoxy system or polyester system or silicone system or polysulfide, is used to fill the space between LCMD film 100 and the glass 230 and is cured to form a cast laminated switchable panel 300 or CLSP. The cured resin 310 becomes an interlayer in the laminated switchable panel 300. A roller lamination may also produce panel 300 or roller laminated switchable panel or RLSP. Cast lamination and roller lamination may be collectively called "liquid resin lamination."

Figure 4:
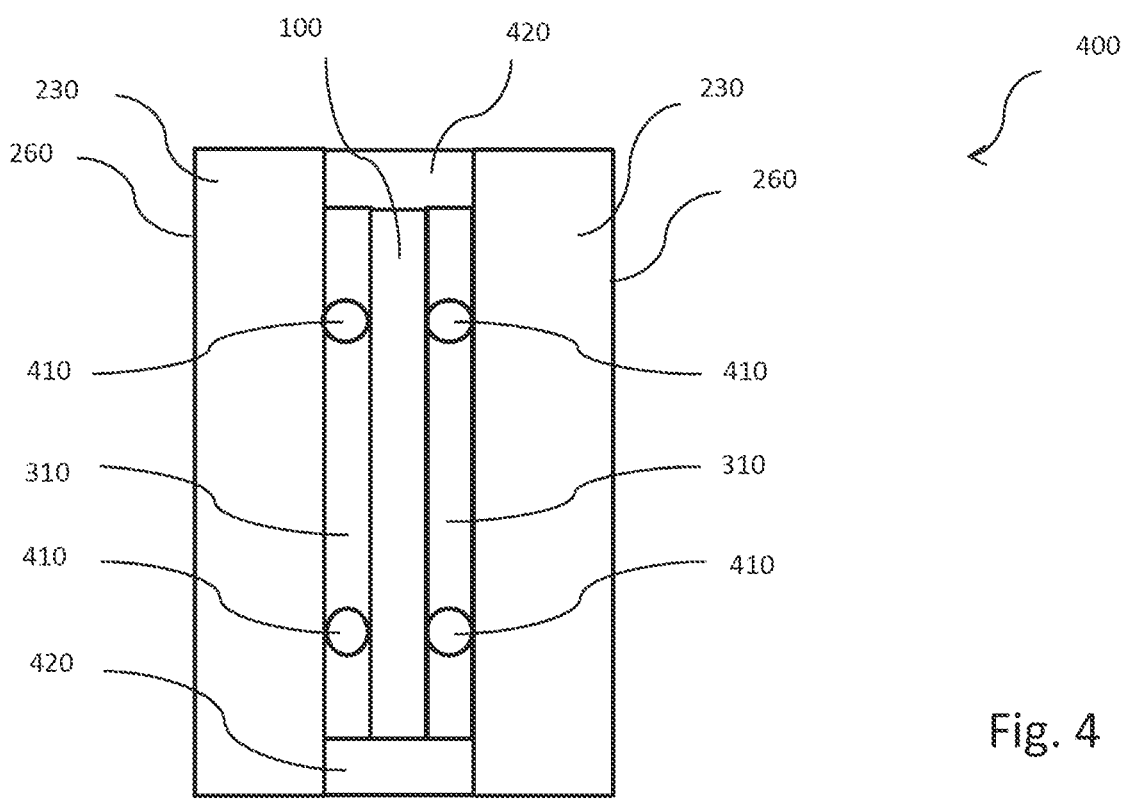
FIG. 4 is a cross-sectional view of one of cast laminated LCMD panel apparatus according to one or more embodiments of the present disclosure.

Referencing to FIG. 4, in one alternative embodiment, an LCMD film 100 is sandwiched between two layers of glass 230 with a cured resin 310. An edge seal 420 is used to seal the panel to form a cavity between two layers of glass 230. The cavity is filled with a liquid resin. For example in various embodiments, spacers 410 may be added into layer of cured resin 310 before the liquid resin is cured to provide a flatness and to ensure that liquid resin may easily cover the entire surface 160 of LCMD film 100 and surface of glass 230. The permanent tape or seal 420 may be used on the perimeter of glass 230, so that edge seal 420 may cover the edge of glass 230 to enhance a bonding between the two layers of glass. Diameter of spacer 410, with spherical or cylindrical shape or other shapes, may be equal or smaller than the actual space that is allowed. Edge seal 420 may have a spacer function and may have sufficient strength and rigidity to keep a gap between two pieces of glass 230. The LCMD film 100 is in the space or cavity that is created by the edge seal 420. Suitable edge seal materials may include adhesion tapes, liquid adhesives, or gelatinous adhesives. The adhesive may be applied with a patterning delivery system. After curing the resin, the adhesive or other sealant material may be allowed to stay in the structure or be removed.

Interlayer laminated LCMD glass panel 400 is much more durable than LCMD film 100. Although interlayer laminated LCMD glass panels have been used as switchable privacy glass for many years, they are quite expensive because production uses a complicated lamination process, expensive interlayer materials, large energy consumption and expensive large equipment. First generation LCMD film, i.e. NCAP film, is made of a water soluble polymer such as polyvinyl alcohol with constant reflective index and is very hydroscopic. NCAP film must be laminated (i.e., with a full interlayer) onto glass to prevent moisture for its main application as switchable privacy glass. The second generation of LCMD films, i.e., PDLC films, made of a regular polymer such as epoxy with constant refractive index, is also sensitive to moisture because of unbalanced chemical ratios caused for matching the refractive index between liquid crystal and the polymer. Therefore, the older generations of LCMD films are mainly used in the form of interlayer laminated glass, and it has been used for many years.

The third generation of LCMD films, or NPD-LCD film, is made of non-linear polymer with gradually changed refractive index. NPD-LCD film usually contains silicon and/or fluoride and is waterproof and quite stable for heat and UV. This film ended the time in which liquid crystal switchable film could only be used in an indoor at air-conditioned environment and could not be used on a window facing outside because the older generations of LCMD films were not stable in air or heat or under UV. NPD-LCD also provides a high quality projection image. Many applications of NPD-LCD film do not require lamination for moisture protection. However, laminated NPD-LCD glass panels are much more durable than non-laminated NPD-LCD film for many applications. NPD-LCD films are available commercially from Scienstry, Inc. of Richardson, Texas. This invention will for the first time introduce special production methods of LCMD film lamination with a new material and new methods allowing for curing under daylight or natural light or UV light. A casting method includes empty panel-forming, liquid resin-filling and resin-curing. A roller lamination method includes liquid resin distribution and resin curing. Advantages of a new material for lamination and new methods of forming a laminated switchable panel are also discussed in the present disclosure.

Figure 5:
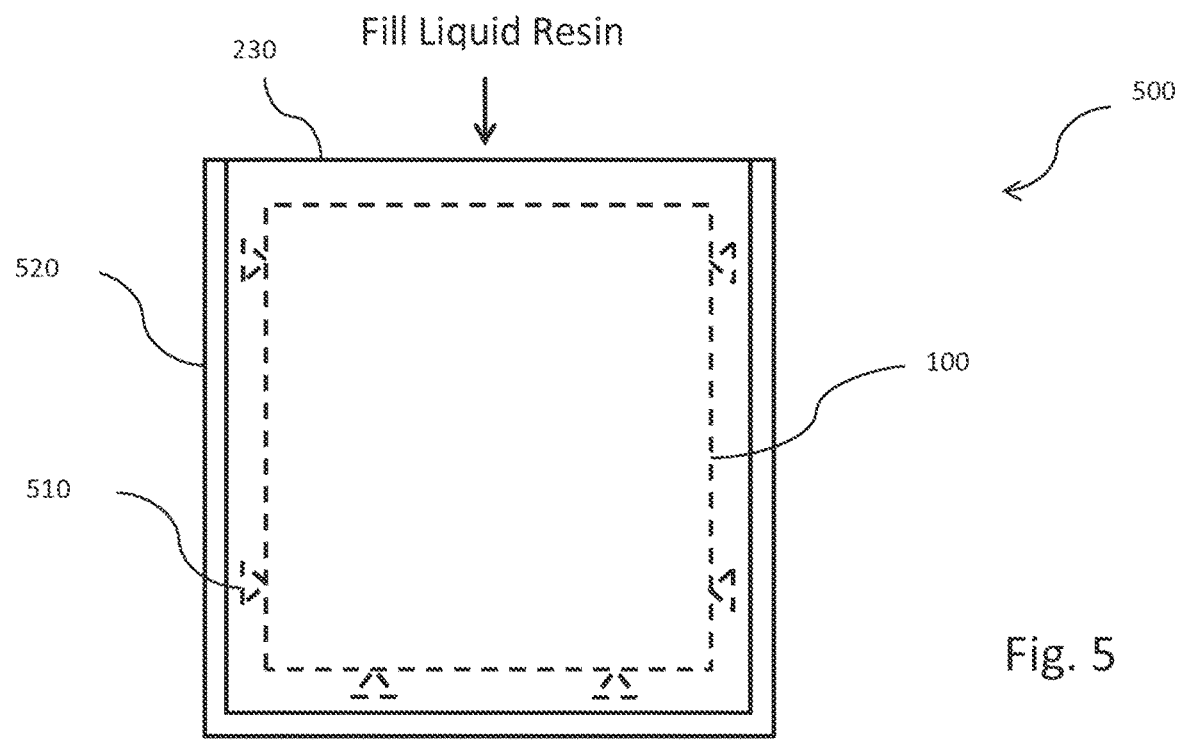
FIG. 5 is a front view of a cast laminated LCMD panel apparatus and illustration of a filling method according to one or more embodiments of the present disclosure.
Figure 6:
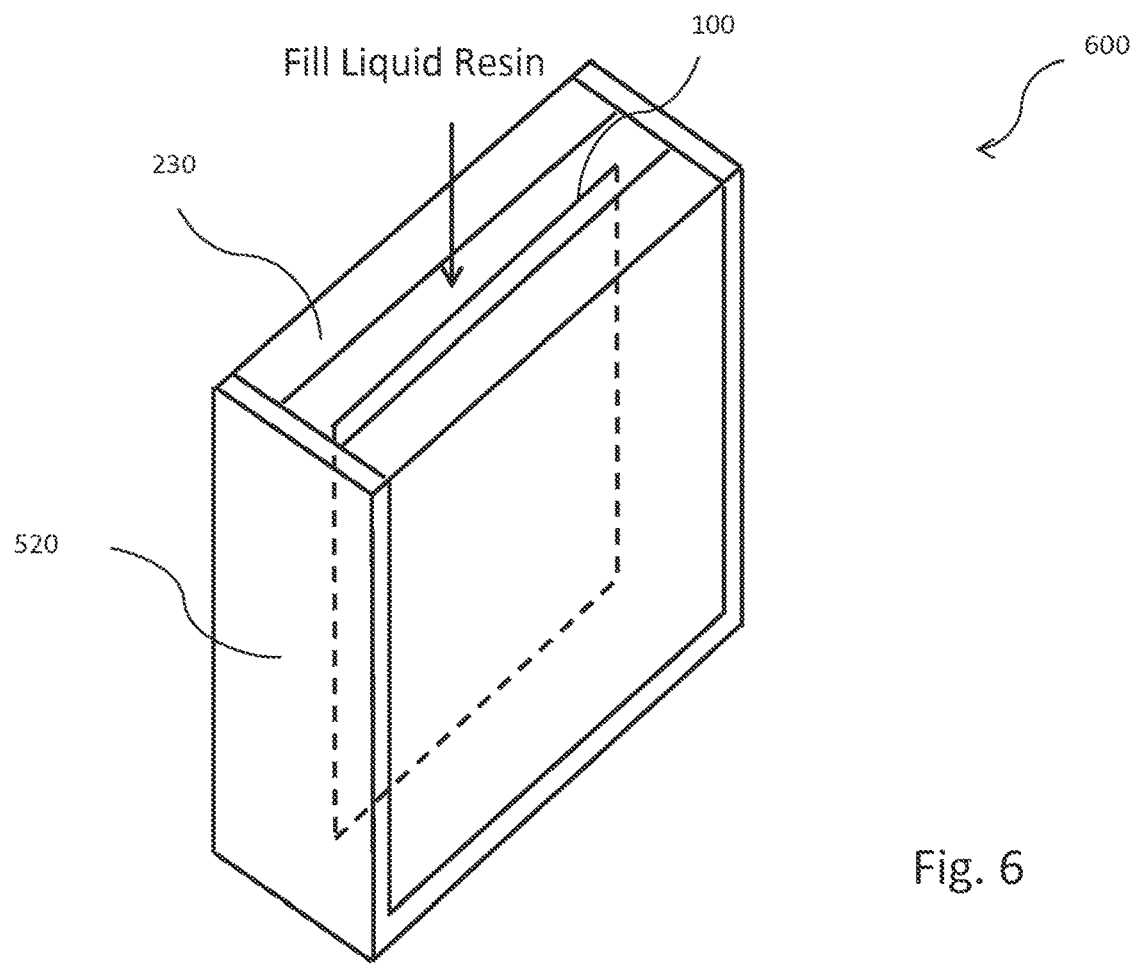
FIG. 6 is an isometric view of a cast laminated LCMD panel apparatus and illustration of a filling method according to one or more embodiments of the present disclosure.

FIG. 5 is a front view of cast laminated panel apparatus 500 according to one or more embodiments of the present disclosure and illustrates a filling method. FIG. 6 is an isometric view of the same panel apparatus in FIG. 5. A manufacturing procedure for one embodiment is: prepare two pieces of glass and one piece of NPD-LCD film and make sure they are clean. Place one of the glass panels on a place, such as an operational table, without bright natural light or strong florescence light. Thoroughly spray spacers (with isopropyl alcohol) over the glass panel. Place NPD-LCD film on top of the glass panel and use small adhesive tape such as illustrated triangle tape 510 to secure film 100 in position. Spray spacers over the top surface of NPD-LCD film. Place the second glass panel over the top of the NPD-LCD film 100 to form an empty cell with edge alignment. An edge seal 420 is not required between the LCMD film 100 and the glass 230. Rather, a tape is used to temporarily seal the edges. Use tape 520 to temporarily seal three edges and move the hollow panel to the vertical position as illustrated in FIG. 5. Use a tape, such as a 2-inch clear tape, to make a funnel on top of an opening (not shown) and pour liquid resin (gravity filling), such as DayLightCure resin, curable with daylight or natural light or sunlight, into the cavity of the panel 500. DayLightCure resin is commercially available from Scienstry Inc., and is an acrylate system containing both aliphatic acrylate, which usually transmits UV, and aromatic acrylate, which usually absorbs UV. Its percentage of aromatic acrylate may be from 10% to 90%; therefore, it may partially allow UV to transmit or totally block UV. After curing, it may be very soft for a sound-proof function or quite tough for a bulletproof function. After the panel is filled, the panel may be allowed to receive natural light, such as through an open curtain, or bright florescence light to cure the resin for 20 minutes or longer. After the liquid resin is cured to provide a bonding between the LCMD film 100 and the glass 230, tape 520 may be removed.

Since DayLightCure resin is only sensitive to a light that contains a component of blue light or UV light, such as daylight or natural light or sunlight, it is safe (no curing) for light from tungsten light bulbs or yellow light. It also provides considerable working time, such as 4 hours, under the normal intensity of fluorescence light. Such well-designed sensitivity provides a great convenience for production and benefits of avoiding expensive equipment and energy. The cured resin 310 does not turn yellow after a long period of use in outdoor condition because it does not contain non-conjugated double bonds or any light-sensitive functional group or any coloring group.

Spacers 410 used in this procedure are to prevent the NPD-LCD film 100 from touching the surface of glass 230, causing a slow filling rate and difficulty in removing bubbles. Spacers 410 may be plastic or glass and sizes of spacers 410 may be between 30 micron and 100 micron or larger. When spacers 410 are smaller than 50 micron or are transparent plastic, spacers 410 are invisible in cured resin 310 and an ultra-clear cured interlayer can be formed. Triangle shape tape 510, which has a spacer function determining a thickness of the cavity, may be left in the panel or inside of cured resin 310. The thickness of tape 510 may be a few microns greater than the thickness of film 100 or much greater. When tape 510 and resin 310 are the same kind of chemicals, such as acrylic tape or polyurethane tape, tape 510 is not visible either. Tape 510 should have reasonable rigidity to hold a space between the two pieces of glass, and other materials may be used for the spacing function and purpose. Wider tape which may adhere on both outside surfaces of glass 230 and may further secure temporary scaling. A razor blade may be used to remove the temporary tape.

Viscosity of liquid resin is critical to filling speed, bubble generation and bubble removal. Preferably the resin viscosity is less than 150 cp at room temperature for cast lamination. When a thin resin is used, bubbles can automatically move up and disappear. The triangle shape of tape 510 allows bubbles to move up easier; other shapes are possible. A tilted filling position may control filling speed, which is helpful for controlling bubble generation. In case some bubbles are generated, gently squeezing the panel from both sides or beating the panel or using a vibrating tool is helpful in removing bubbles. When a DayLightCure resin (a resin that may be cured with daylight or natural light, but is safe under tungsten light) and normal brightness of florescence light is used, the panel can be cured indoors close to a window facing outside for one or two hours, or cured in a shaded outdoor area for about 10 minutes or cured in a few minutes with UV light.

Curing condition is very critical to the success of making cast laminated switchable panel. Since orientation of liquid crystals determines a switchable function and uniformity of LCMD film, any force that may influence orientation may affect the uniformity. These forces include electrical forces (like alternating current (AC) and direct current (DC) and electrostatic charge), physical forces like pressure or bending, and chemical forces like surface tension or surface energy or a buffed surface. Positive liquid crystal molecules prefer to align with the direction of the long axis of a microdroplet to keep a minimal internal energy. For example, when a LCMD film is bent, the bent area shows less opacity, because the shape of microdroplets at the bent area is flattened. In interlayer lamination, heating rate and cooling rate must be kept very slow to ensure temperature uniformity. It is necessary to know that a fast UV curing may cause problems, such as uneven opacity or scattering plaque, because an ultraviolet polymerization is a strong exothermic reaction and an improper curing condition or design may create asymmetric pressure or force. An uneven resin layer causes scattering plaques. Localized high temperatures often generate uneven shapes of microdroplets in LCMD film. Therefore, daylight curing becomes useful for individual or small companies for making cast laminated LCMD panel, because it easily covers a large area with a relatively slow curing rate. Curing rate is relatively slow because there is only a little UV component in daylight or natural light. This new method makes cast lamination for LCMD panels easy. This method not only resolves unevenness with common UV processes, but greatly reduces cost in production and equipment and improves safety conditions by eliminating ozone generation. Although a black UV light (UVA, no ozone generation) is hardly used in producing polymers, a diffused black UV light may cover a large surface and may have the same function as daylight in making cast laminated switchable panel.

Figure 7:
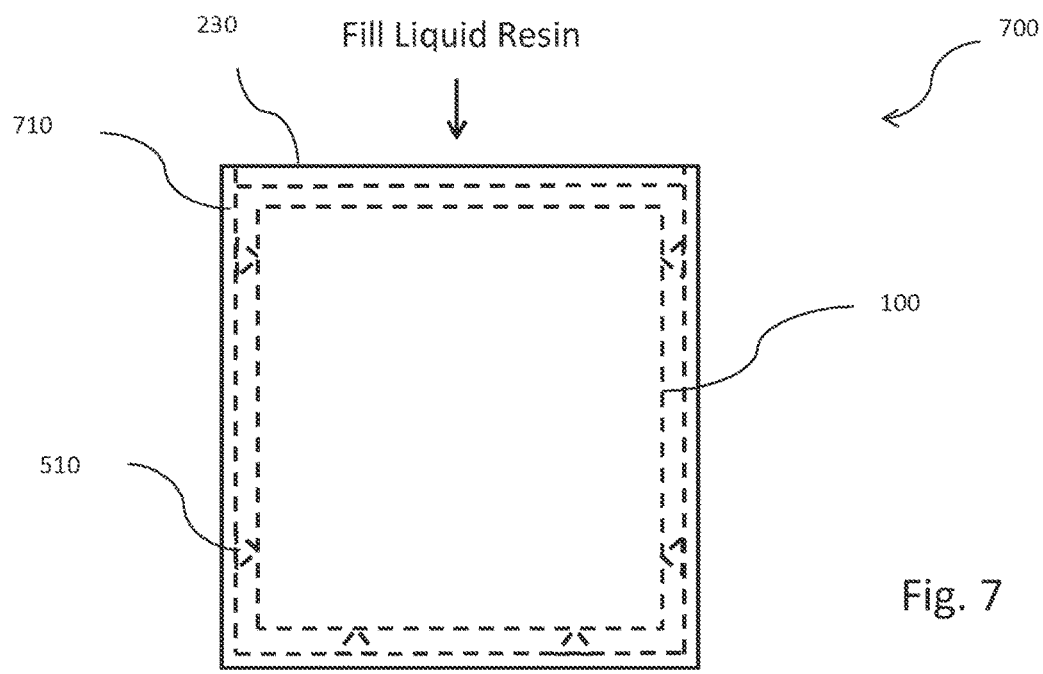
FIG. 7 is a front view of a cast laminated LCMD panel apparatus with an edge seal and illustration of a filling method according to one or more embodiments of the present disclosure.

FIG. 7 is a front view of one example of a cast laminated switchable panel apparatus according to one or more embodiments of the present disclosure, and illustrates the gravity-filling method. An LCMD film 100 is sandwiched within two pieces of glass 230. Triangle-shaped tapes 520 are used to position the LCMD film 100. Edge seal tape 710 is used to seal two pieces of glass at two vertical sides and bottom to create a space or cavity for LCMD film. This tape 710 will permanently remain in the structure of the CLSP. The top edge retains open with tape protective liner. Liquid resin may be injected into the cavity through a flat nozzle. The flat nozzle may have a 0.5- to 1-millimeter gap and about a 4-inch width. Liquid resin may be pumped into the cavity while the panel is in a basically vertical position. Liquid resin may be pumped into both sides of LCMD film 100 until about 80% to 90% of the height of the panel is filled (depending on glass thickness and flexibility). The liner and seal on most part of the top edge may be removed, leaving a corner unsealed. When the panel position is changed from vertical to horizontal, air will be squeezed out from the unsealed corner by glass weight. The corner may then be sealed and any possible air bubble removed with a long-needle syringe. If the liquid resin is DayLightCure resin, the filled panel may be cured under daylight or natural light.

It is not necessary to use spacers and to keep LCMD film 100 in the middle of the cavity in FIG. 7 or other embodiments of cast lamination. LCMD film 100 may be close to one layer of glass and far from another layer of glass to create a bigger filling space. In other words, thicknesses of liquid resin in two different sides of LCMD film 100 may be different. To achieve such a situation, before forming a hollow glass panel, LCMD film 100 may be first laminated on one layer of glass by a hand roller lamination with the same liquid resin, with or without curing. After forming the cavity with LCMD film inside, there is only one space to be filled with liquid resin. This situation is just like making regular cast laminated clear glass panel without a LCMD film. In this way, it is easy to remove possible air bubbles by a long needle syringe, because the layer thickness of liquid resin is bigger. After filling liquid resin, the panel may be cured with UV light.

Figure 8:
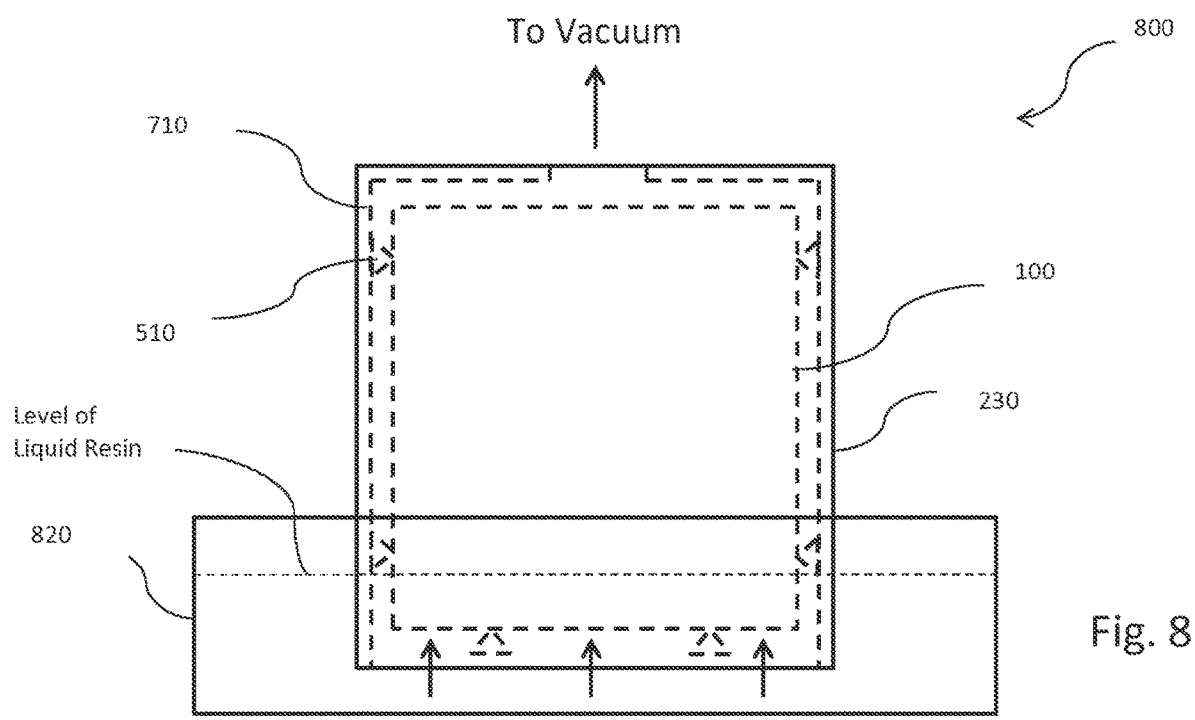
FIG. 8 is a front view of a cast laminated LCMD panel apparatus and liquid resin container and illustration of a vacuum filling method according to one or more embodiments of the present disclosure.

There are other filling mechanisms that can be utilized in cast lamination, including, but not limited to, vacuum filling, which is illustrated in FIG. 8. In this embodiment, seal tapes 710 are only placed on two vertical edges and some areas at the top edge. The bottom edge remains open. When the bottom of the empty panel is submerged into liquid resin and vacuum is introduced to the panel from top openings, liquid resin may be filled up to cover the entire panel. This method is suitable for liquid resins that have higher viscosity. Almost no bubble may be generated in this vacuum filling process. Filling speed is quite fast. It takes a few minutes to fill up a panel of about 3 square meters. This filling mechanism is suitable for a combination of medium viscosity liquid resin and thin gap of the empty panel; so that capillary action may hold liquid resin in the panel after the panel is removed from liquid resin container 820. Such situation provides a convenience in production without blocking the top and bottom openings. A thin gap may also keep the LCMD film flat and use less material of liquid resin. The vacuum outlet on the top may connect to an air-liquid separator to separate liquid resin and air, because at the end of a filling, liquid resin and air bubbles always come out together. Collected liquid resin may be reused. The DayLightCure resin may have a range of viscosities by using different ratios of monomers and oligomers.

Figure 9:
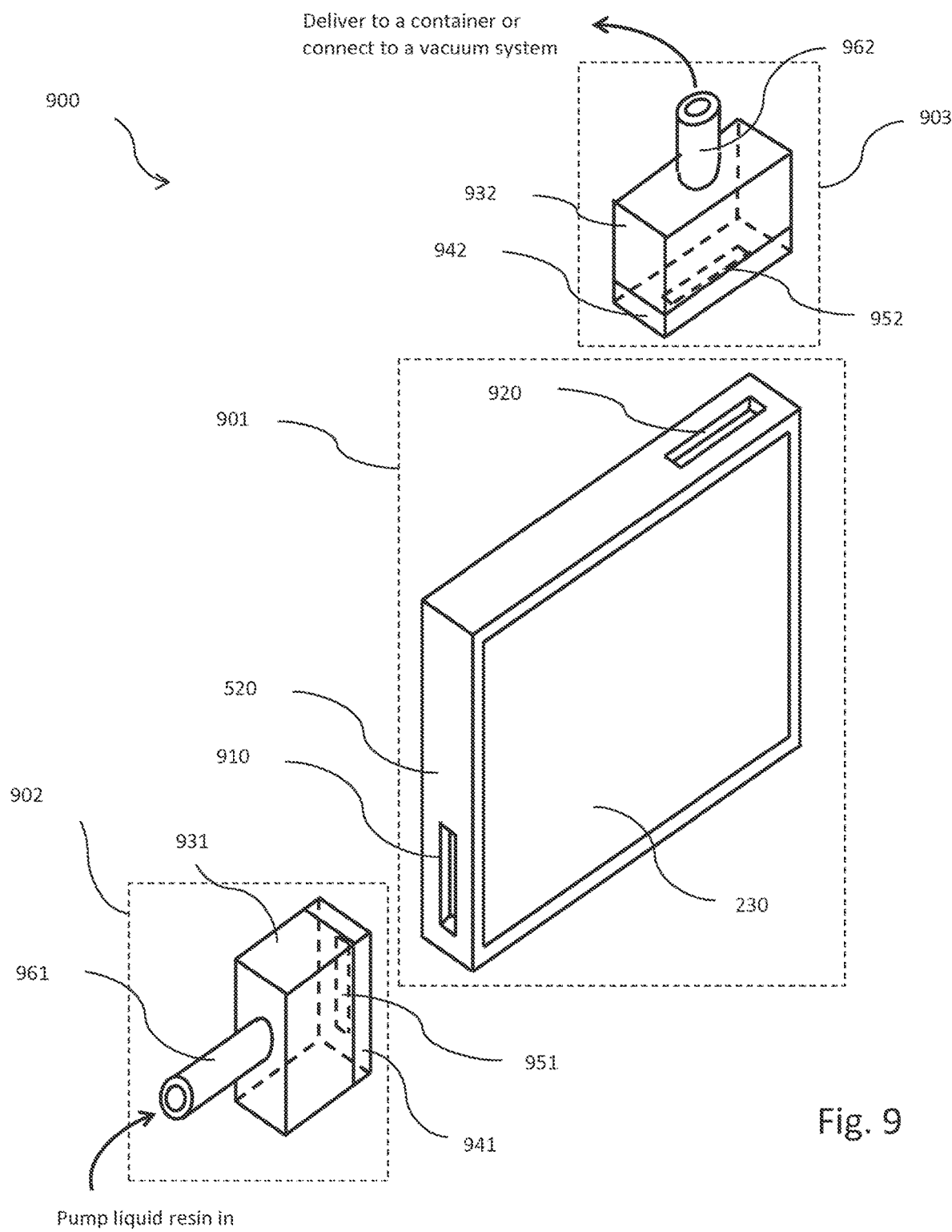
FIG. 9 is an isometric view of a cast laminated LCMD panel apparatus and illustration of pressure and pressuro-vacuum filling methods according to one or more embodiments of the present disclosure.

Referring to FIG. 9 for one or more embodiments of the present invention, pressure or pressure-vacuum filling system 900 and method are illustrated. The system includes three parts: empty switchable panel 901, inlet fixture 902 and outlet fixture 903. These parts are shown within dashed lines separately. LCMD film is sandwiched between two pieces of glass 230 with or without spacers to form empty switchable panel 901, as described in previous embodiments. All edges of glass 230 (FIG. 2) are sealed with a temporary sealing tape 520. Inlet slot 910 may be at lower left side of panel 901, as illustrated, or at the bottom center of panel 901. An outlet slot 920 may be on the top right corner, as illustrated or at the top center of the panel. The inlet fixture 902 may consist of a housing 931, gasket 941 and inlet tubing 961. Inlet slot 951 in gasket 941 may be made of silicone rubber or other solvent-resistant soft material. Outlet fixture 903 consists of housing 932, gasket 942 and outlet tubing 962. There is an outlet slot 952 in gasket 942. In operation, inlet fixture 902 is connected to inlet slot 910 and outlet fixture 903 is connected to outlet slot 920. Liquid resin may be delivered into the cavity of empty panel 901 by a pump, such as peristaltic pump or tubing pump, connected to inlet tubing 961. When outlet tubing 962 is connected to a receiving container that is open to the atmosphere, this system is a pressure filling system. When outlet tubing 962 is connected to a vacuum system, the system becomes a pressure-vacuum system. Air in the cavity of the empty switchable panel 901 may be easily removed. Outlet tube 962 may connect to a vacuum system through an air-liquid separator. Collected liquid resin may be reused after filtration. This system has a very fast filling speed and is suitable for both mass production and small production. The system illustrated in FIG. 9 has many advantages in production. Under a vacuum condition, air bubbles become quite large, noticeable and movable. With a high filling speed or some pulses, any air bubble may be easily removed from panel 901. After filling a panel, continually flowing does not affect a final result and the filling process may be ended at any time. This characteristic is good for making glass panels with multilayers, such as bulletproof glass or hurricane proof glass, and it almost takes the same time to make a panel with multiple interlayers or with single interlayer. It is also good for automation in mass production in which a system simultaneously fills multiple panels and the filling process may be set with a little overtime to ensure every panel is filled. This is a very compact and low-cost system, and is easy to keep clean.

There is a strong need to use a rigid product incorporating LCMD film for windows and glass walls partitions because rigid materials, such as a glass panel, have much better durability for impact and resistance to scratches from daily activity. Glass panel apparatus incorporating LCMD film is a better fit for many applications and protect the LCMD film for a longer lifetime. For better durability and safety, laminated glass is needed in many applications, especially in public areas like stores, malls and airports. Although cast lamination has some advantages over interlayer lamination for regular glass panels without LCMD film, cast lamination in the production of switchable glass is new, because of the difficulty and sensitivity of LCMD film for production. It is not common to see the polymerization of a liquid resin which can be cured by daylight. Such liquid resin may have adjustable viscosity to fit different filling mechanisms, designed toughness to fit different applications and strong adhesion to handle varied application conditions.

Figure 10:
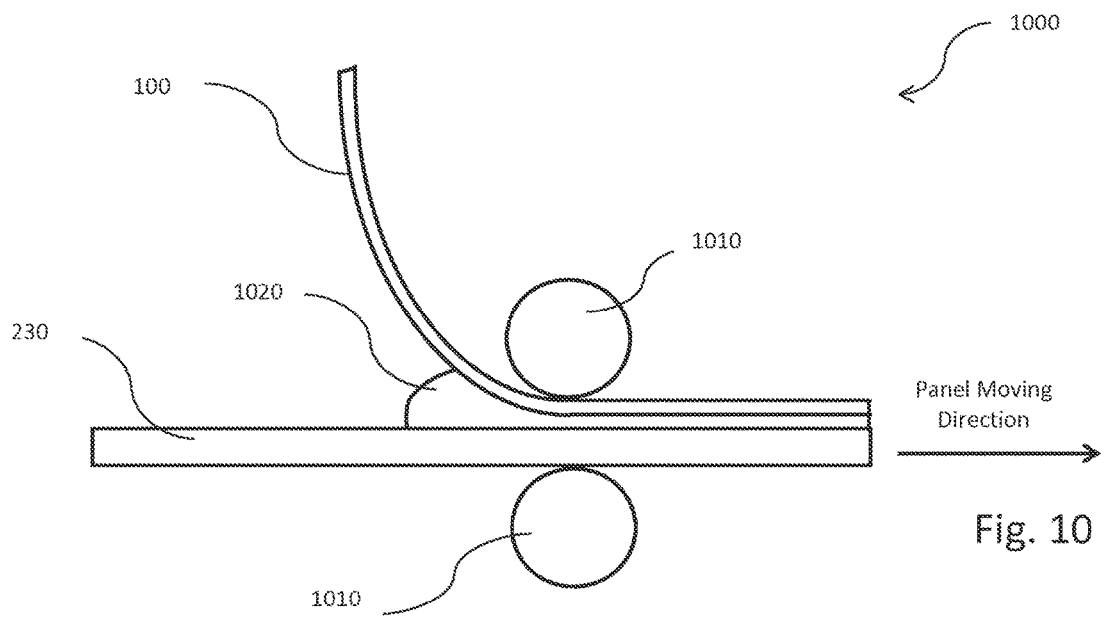
FIG. 10 is an illustration of roller lamination with one layer of glass and one layer of LCMD film according to one or more embodiments of the present disclosure.

Due to the recently successful development of thin and flexible glass, which may be rolled up, a new roller lamination for making laminated switchable panel becomes possible, especially using a paper-thin glass. This method uses a relatively thick glass piece, for example with a thickness of 0.25 inch to 0.5 inch, as a rigid part and laminates two relatively flexible layers, LCMD or other switchable film and thin glass, on the thick glass. This new method of roller lamination is illustrated in FIG. 10. Laminated switchable panel 1000 is formed with one layer of glass 230 and one layer of LCMD film 100. When top roller 1010 rotates counterclockwise and bottom roller 1010 rotates clockwise, layers between the two rollers are laminated together and moved to the right. The gap between the two rollers 1010 controls the overall thickness of a laminated panel. Roller lamination system 1000 allows layer of glass 230 and layer of LCMD film 100 passing through rollers 1010 to have a uniform pressure; therefore, a thin layer of liquid resin 1020 may be formed between glass 230 and LCMD film 100. Spacers may be added into liquid resin 1020 to control the thickness of the layer of liquid resin 1020 to a desired thickness. The refractive index of spacers may be matched to the refractive index of liquid resin 1020 for reduced haze. Matching refractive indices may be easily achieved by using the same type of materials for both spacer and liquid resin, such as an acrylic material. When spacer size is smaller than 0.1 millimeter, it is not easy to see spacers or haze with or without matching the reflective indexes. Roller lamination is also workable without spacers in liquid resin 1020, if the liquid resin layer does not need to have a precise thickness. Liquid resin may be delivered on glass 230 with adhesive transfer tape or roller transfer printing or spray coating or doctor blade coating methods and the thickness of glass 230 may be much thicker than paper, such as ¼-inch thickness.

Figure 11:
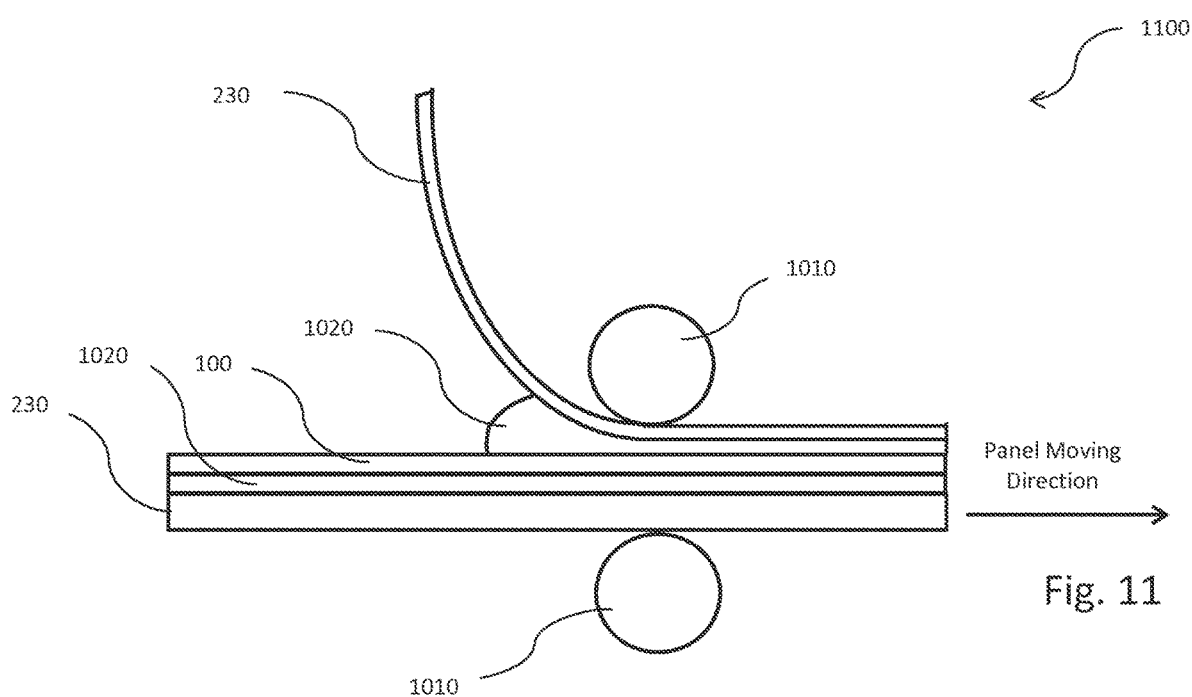
FIG. 11 is an illustration of roller lamination with two layers of glass and one layer of LCMD film according to one or more embodiments of the present disclosure.

Lamination system 1000 may be further laminated with thin flexible glass to give a high strength and anti-scratching functions and/or a soundproof function. FIG. 11 illustrates roller lamination system 1100 and process and method to produce laminated switchable panel 300 (FIG. 3) with two layers of glass and one layer of LCMD film 100. Since top glass 230 used to cover LCMD film 100 is thin and has good flexibility, the thin glass may be easily treated tike a layer of plastic film. Spacers may be used in the second lamination to control layer thickness of liquid resin 1020. A panel through lamination system 1100 not only has the same structure (cast lamination), but also has the same functions such as rigidity, anti-scratch outside surfaces and it is totally sealed for better protection from moisture and UV. The top covering glass is not necessary to be very thin if it is a little longer and lifted at end. The weight of the glass may make it bent and easy for roller lamination, therefore, ¼ inch thickness of glass may be used as top covering glass.

Figure 12:
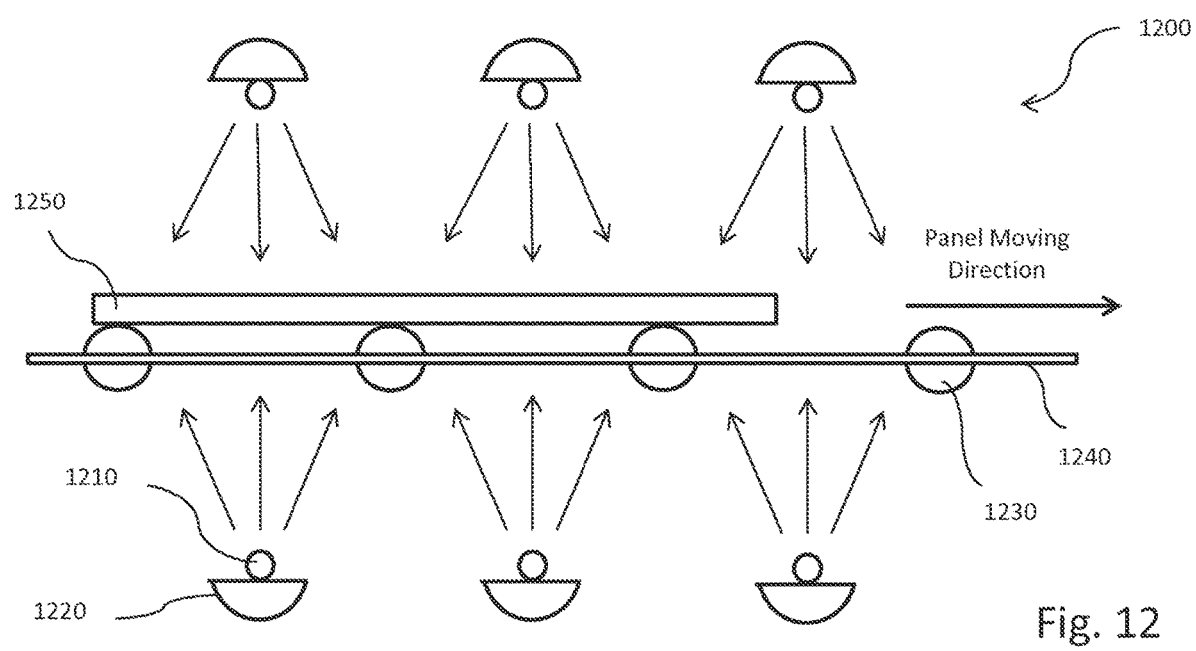
FIG. 12 is an illustration of a UV curing process tor producing liquid resin laminated switchable panel (LRLSP) according to one or more embodiments of the present disclosure.

After a first lamination in roller lamination system 1000, the panel may be cured through a UV curing system 1200 such as illustrated in FIG. 12. The uncured panel may directly have a second lamination. A panel through roller lamination system 1100 may be finally cured through UV curing system 1200 or with natural light. FIG. 12 illustrates a conveyor UV curing system 1200. It includes conveyor roller 1230 and conveyer frame 1240. Pre-curing part 1250, such as apparatus 300, 400, 500, 700 (FIGS. 3, 4 5 and 7, respectively), or a panel from system 1000 (FIG. 10) or system 1100 (FIG. 11), is placed on the conveyer. When rollers 1230 rotate clockwise to move part 1250 to right, the part is exposed to UV radiation from top and bottom UV light bulbs 1210, equipped with reflector 1220. The length of UV light bulbs 1210, shown in section view of FIG. 12, may be 2 to 3 meters, to cover the width of produced parts. UV light resource 1210 may be a mercury vapor lamp or fluorescent lamp or LED UV light. Faster curing usually occurs with wavelengths between 240 nm to 270 nm and wavelength round 365 nm.

Advantages of roller lamination include fast production and easy process because roller lamination usually does not generate air bubbles. Roller lamination system 1000 and system 1100 may be designed tilted down or vertically. Air bubblies may be automatically squeezed out in lamination.

A LCMD film 100 may be simultaneously laminated with a thick glass on one side and a thin glass on another side with liquid resin to produce the same product as shown in FIG. 11. By going through a similar process to that illustrated in FIG. 10 or FIG. 11, LCMD film 100 may be laminated with a single passing of lamination with two layers of glass on both sides. Another advantage of roller lamination that is good for mass production is that the process is simple and no step of the process has to be manually handled by an operator. In interlayer lamination, positioning is quite time-consuming and there is risk of generating defective products, because of the difficulty of positioning three non-transparent sheets, or one LCMD film and two sheets of interlayer. In the glass industry, an interlayer lamination normally starts with a precise size of glass 230. Precision positioning of LCMD film 100 is required, because after curing the interlayer, nothing can be changed. In roller lamination, the sequence of cutting and curing may be switched, with curing first and then cutting. Glass 230 size may be much bigger than the size of LCMD film 100 at the beginning of the process. Curing may also be divided into two stages. The first curing may be controlled to an intermediate level, in which cured liquid resin is still quite soft like jelly. Most resins shrink, when they change from liquid to solid and generate heat as they polymerize, (an "exothermic" reaction) and this causes vacuum bubble or spot problem in east process. In roller lamination, an extra depth of edges of glass 230 may be used to prevent leaking, which allows the process to run faster. The extra depth of edges of glass also has a very important function to prevent vacuum bubbles or spots generated by shrinkage of liquid resin in polymerization, because the edges are open. A precision glass cutting, such as automatic pattern recognition cutting, may be conducted after the first curing, then followed with a second curing or post curing to give a final product. Such production flexibility may reduce the defective rate in positioning and be good for increasing the level of automation in production and prevent the problem of generating vacuum bubbles in the fast UV-curing process.

The manufacture of LRLSP like apparatus 300 has a great advantage in energy consumption as compared to the manufacture of traditional interlayer laminated LCMD glass like apparatus 200, because the manufacturing process for apparatus 300 may be conducted at room temperature, whereas the interlayer lamination process must be conducted at high temperature. The interlayer lamination process also needs large equipment such as an autoclave or vacuum oven. A manufacturing method avoiding high temperature is also favorable for extending the lifetime of LCMD film. Non-liquid crystal film, such as suspended particle display (SPD) film or electrochromic film or thermochromic film, is usually more sensitive to high temperature. Cast lamination and roller lamination become a good manufacturing process to produce such switchable panels.

There is also a saving on materials used in apparatus 300 in comparison with apparatus 200. Apparatus 300 avoids using expensive interlayer material and vacuum air bags. Cost of liquid resin, such as DayLightCure resin, is only a fraction of the cost of interlayer material. Omitting the interlayer also eliminates optical distortion and some level of haze, which is common with polymer interlayers.

The cast lamination process used to make the apparatus 300 is easier and simpler than the classic interlayer lamination used to make apparatus 200. Interlayer lamination has special requirements on the thickness of glass to ensure uniformity of heating. The thickness in interlayer lamination is neither too thick nor too thin. The cast lamination process used to form apparatus 300 permits greater variations in the thickness of the glass, ranging from inches in thickness to paper-thin glass.

When very thin glass is used, roller lamination may be applied, because very thin glass is flexible and can easily go through a roller laminator. Commercially available from Corning and Schott, super thin (0.55 mm) glass even makes the resin lamination as simple as a thin plastic sheet lamination. For example, in various embodiments, a layer of LCMD film may be adhered to existing glass (e.g., in a window or glass door). A hand roller lamination method may be used to install an LCMD film on an existing window with liquid resin and then covered by a paper-thin glass with a liquid resin. To form the apparatus 300 on an existing window glass, the following sequence may be followed: put an LCMD film on the existing glass with double sided tape in two vertical edges and the bottom edge. Add liquid resin, such as DayLightCure glue, from the unsealed top opening into the cavity formed. When resin drops down to bottom, use a hand roller, such as a soft rubber roller with 4 inch width, to laminate or roll depress the film from bottom to top and ensure that liquid resin is uniformly distributed in all area without bubbles. Cover the film with paper-thin glass with double sided tape in two vertical edges and the bottom edge. Add liquid resin in the newly-formed cavity between the LCMD film and the paper-thin glass. Laminate or roll-depress the paper-thin glass from bottom to top. After lamination, the liquid resin may be cured with portable UV light or natural light. Spacers may be mixed with liquid resin. The method also allows use of thicker glass, such as ⅛ inch or thicker. The resulting panel has the same structure and functions as apparatus 300, made by cast lamination or machine roller lamination, but has a lower cost for an existing window.

Comparing production efficiency, the cast lamination and roller lamination processes used to form apparatus 300 have a much higher efficiency. An interlayer lamination process using an autoclave needs to vacuum several hours to remove air from an air bag containing five layers of different materials like LCMD film, two sheets of interlayer film and two pieces of glass. It takes a long time to remove air from four very fine gaps between the interlayer and LCMD film and between glass and interlayer, and any contamination of air will cause defects on the final laminated glass—with shining air bubbles. In order to keep temperature uniform on the materials in an autoclave, a slow heating process is required. In order to avoid glass breaking and a slow cooling process is required. Lamination with a vacuum oven has similar inefficiencies, except no additional pressure is applied on the air bag. These requirements result in a low efficiency in the overall process of interlayer lamination, usually needing an entire day to finish one process cycle. The new cast laminated or roller laminated glass structure of apparatus 300 simplifies the production process and may greatly increase efficiency. Processes to make liquid resin laminated glass or liquid resin laminated switchable glass as in apparatus 300 may be easily completed in less than one hour. It is very suitable for production with an automatic production line or roller laminate for regular panels. Since cast lamination and roller lamination processes do not need heavy equipment and special materials, it may be as simple as common assembly of pre-fabricated furniture. Production for LRLSP can be conducted not only in mass production, but also by a single person or at customer job sites.

On the other hand, preventing delamination is important to the production of laminated LCMD glass because any delaminated area is noticeably bright. Uneven bottom edges of two pieces of glass may contribute to delamination because of a shearing force generated between two pieces of glass. Delamination may occur on any layer of a LC-polymer matrix, between a film and an interlayer, or between an interlayer and a pane of glass. Often the use of suction cups to move laminated LCMD glass is discouraged due to the delamination potential. These risks do not exist for the liquid resin laminated products, because adhesion of cured resin to glass and to LCMD film is usually much stronger than adhesion of interlayer, because interlayer is only partially melted during heat lamination in autoclave and plasticizer contained in interlayer affects good adhesion. Adhesion in liquid resin lamination is fully on the molecular level, in which material molecules chemically provide much stronger bonding than physical bonding. If is generally safe to use suction cup movement in the production of apparatus 300. Therefore, production yield is higher and installation is easier. The costs associated with producing and using apparatus 300 are, therefore, reduced compared to apparatus 200, with energy savings, less material usage, simple equipment needs, a simple process, less manpower needs and high efficiency. The production of liquid resin laminated switchable panel (LRLSP) may cut in half the costs as compared with the production of interlayer laminated LCMD glass. Apparatus 300 combines advantages of privacy, projection and durability together. Such new methods and new material may have many new applications.

LRLSP like apparatus 300 may have a variety of applications, such as a building window, light diffusion applications, energy-saving applications, privacy applications, dry erase boards, and projection screen functions. LRLSP may be used in homes, offices, classrooms and hospitals, stores, malls, airports and companies for various purposes like entertainment, advertising, education and work.

Apparatus 300 combines the advantages of durability, easy to make and use, well-protected formation in glass format, low cost in production and no need of large equipment in production. One person without a need of any large equipment may produce LRLSP at a very low cost. It is also easy to make hurricane-proof glass or hurricane-proof switchable glass or bulletproof glass or bulletproof switchable glass by liquid resin lamination and DayLightCure resin.

For some applications of LRLSP, such as a glass curtain wall or projection advertising on a glass wall of a building, safety may be a concern. All types of architectural safety glasses, including reinforced, toughened and laminated glasses, may be used as glass 230 in apparatus 300. Glass 230 may be in more durable forms such as laminated glass, tempered glass, hurricane proof glass or bulletproof glass to enhance strength and safety. Any transparent panel with special features such as safety, double-layer or self-cleaning may be used as glass 230 in apparatus 300. More specifically, liquid resin laminated glass may be formed with two or more layers of silica-based glass or a combination of silica-based glass and polymer-based panel. Bulletproof glass is one kind of laminated glass, with a strength capable of stopping a shooting bullet. Laminated glass may be formed by an interlayer with the autoclave or vacuum oven process, or by cast lamination or roller lamination and cured with UV or daylight or natural light or catalyst or a thermos-curing process. Catalysts include photoinitiator 1173 for acrylic resin and MEK peroxide for polyester resin, and triethylenediamine for polyurethane. Although these methods may provide high strength like bulletproof glass, the cast process and the roller process have much lower costs. Day light curable resin or DayLightCure resin may have the lowest cost, because it utilizes natural light to cure resin without a need of special curing equipment and conditions. LRLSP with or without enhanced glass 230 is safer when used as a glass wall for a building.

When adding a LRLSP to an existing window, a gap between the existing glass and LRLSP can be created. Since air only has 3% of thermo conductivity of glass, an air gap is very efficient in blocking heat transfer. Such air gap and infrared rejection function of LRLSP, like a white paper, may provide a good energy saving solution while adding a projection function to this window. If an existing window is a double-pane window, a second air gap may be created by adding a LRLSP with a selected distance to form the second air gap. Two air gaps and one IR reflection layer may provide a great energy saving for a building.

Figure 13:
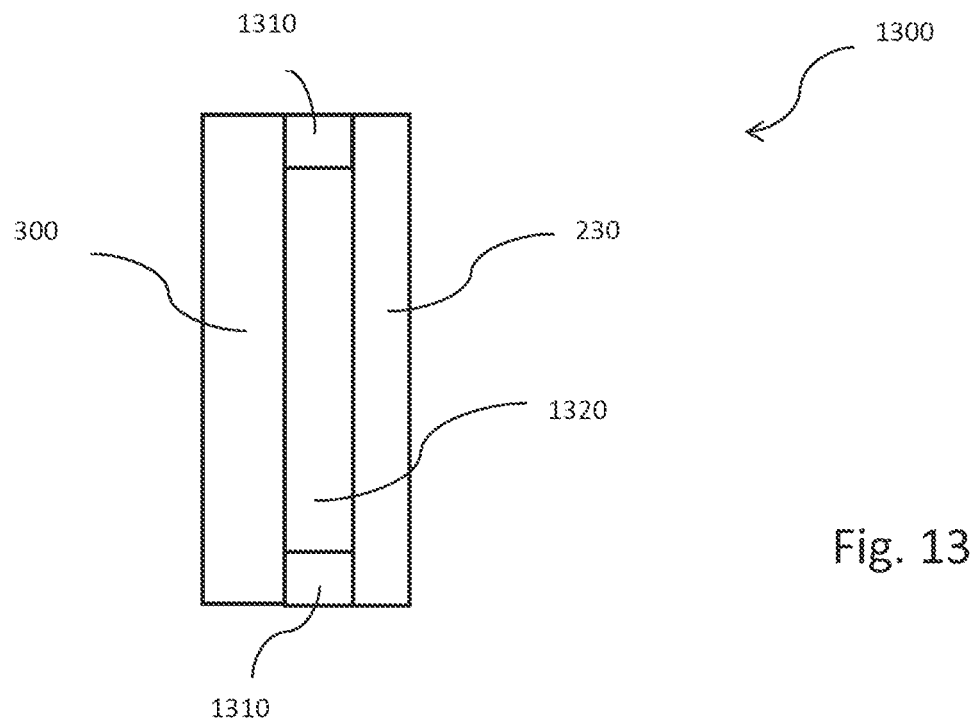
FIG. 13 is a cross-sectional view of a window panel apparatus with a liquid resin laminated switchable panel (LRLSP) and one air gap according to one or more embodiments of the present disclosure.
Figure 14:
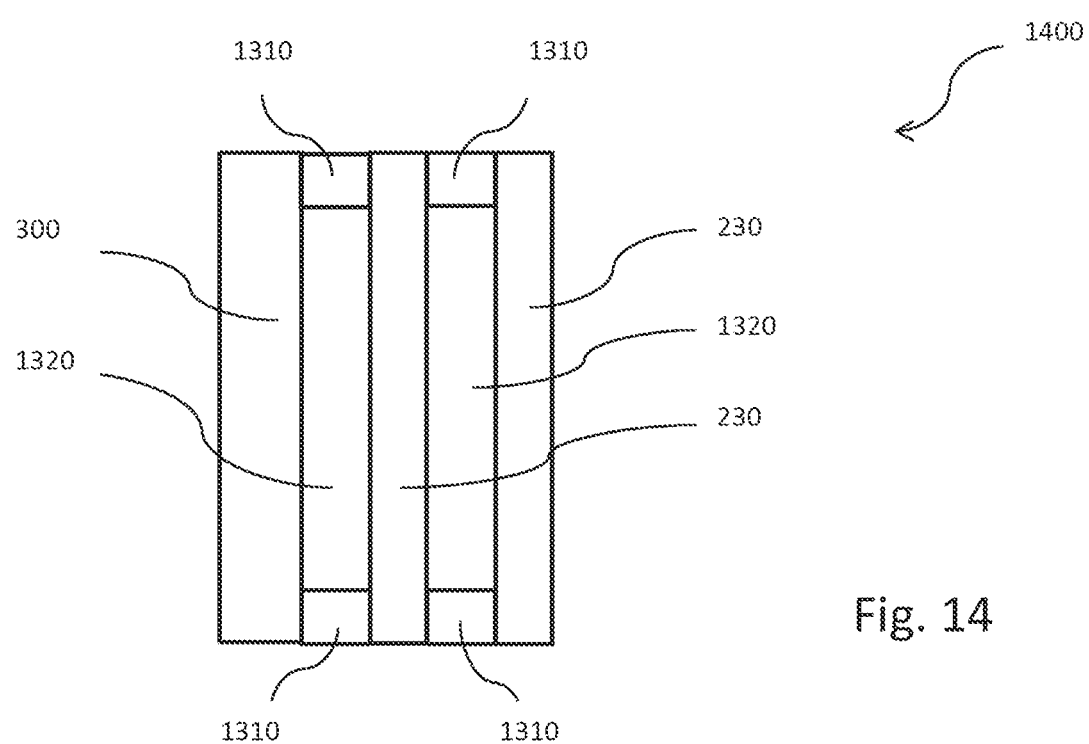
FIG. 14 is a cross-sectional view of a window panel apparatus with a liquid resin laminated switchable panel (LRLSP) and two air gaps according to one or more embodiments of the present disclosure.

According to the structure described above, a standalone window glass 1300 and 1400 may be built as illustrated in FIG. 13 and FIG. 14, respectively. In one embodiment illustrated in FIG. 13, one LRLSP 300 and one layer of glass 230 may be built together with a sealing spacer 1310. LRLSP 300 may be an inside layer or outer layer to a room. In another embodiment illustrated in FIG. 14, one layer of LRLSP 300 and two layers of glass 230 may be built together with sealing spacer 1310. LRLSP 300 may be inside layer to a room or outer layer or in middle of the glass 1400. Air gap 1310 may contain other gases such as inert argon gas for lower thermal conductivity. All ways of energy transferring may be efficiently blocked by such structures. Heat conduction can be blocked by the outer layer of the glass panel. Radiation energy may be rejected by NPD-LCD film, and convection heat may be efficiently blocked by an air gap. However, most visible light may travel through window glass 1300 and 1400. The intensify of visible light getting into a room may be adjusted by applying different voltage to NPD-LCD film inside of window glass 1300 or 1400. Although NPD-LCD film has been used in the descriptions and illustrations included herein, it should be understood than any switchable film may be used in place of LCD film.

To reduce building energy consumption, reducing heat transfer across windows is very important. It is necessary to emphasize overall efficiency and controllability, because energy saving is not dependent on one situation. Sometimes, one effort for saving energy in one situation is offset by another situation. For example, absorptive (pigment type) or reflective (metallic coating) window films may block over 80% of natural light while blocking infrared, thus causing more energy consumption due to the resulting use of artificial lighting inside of a building. Oppositely, when infrared is mainly blocked, diffused visible light from NPD-LCD film can reduce the use of artificial lighting. A reflective window film, such as a metallic film, may reject sun's heat gain in summer, but it will also block the sun's heat in winter and cause more energy consumption from heaters. LRLSP can efficiently handle both situations, with its switching capability. It may reject summer sunlight heat in the scattering mode and allow sunlight heat in winter in the clear mode. During a winter night, it can retain inside heat in the scattering mode. Since opacity of NPD-LCD film can be gradually changed by different voltages from totally clear to completely opaque, a computer can be used to automatically control opacity of a window and ceiling to minimize energy use for all seasons. A solar cell panel may provide enough power to drive and control NPD-LCD film or glass. Therefore, overall high efficiency in energy saving can be achieved with its great controllability. Since switching sensitivities for different wavelengths of natural light are dependent on droplet sizes contained in an NPD-LCD film, a selective switching function for specific wavelengths from infrared to near ultraviolet may be achieved by involving proper sizes of liquid crystal droplets in the LC-matrix of NPD-LCD film. Calculation and testing have shown that the multilayer window glasses illustrated in FIG. 13 and FIG. 14 have high efficiency in energy saving in comparison to many known window films and window structures.

LRLSP is also good for rear projection. This feature may make building walls more valuable for displaying information and advertising. For projection, ambient lighting conditions are important. Many projection screens require a dark environment. In order to broaden the applications for LRLSP, it is necessary to enhance the image quality of projection under a bright ambient light. Quality may be significantly improved by a higher contrast ratio. While bright portions of projected images can be easily enhanced by a more powerful projector, a black color cannot be created by a projector. Black portions of projected images are only dependent on the environment or color of the projection screen. Therefore, increasing projection lumens or/and darkening apparatus 300 may be helpful to improve image quality. The liquid resin may have different colors by adding dyes or pigments into it. Although dyes may be added into either liquid resin 1020 or NPD-LCD film to make a dark LRLSP, darkening liquid resin with dyes or pigments has much lower cost, because only expensive dichroic dyes may be used in NPD-LCD film. A dark color or any other color is good for many other purposes, such as color matching or decoration. Anti-reflective coating may be used on the surface of LRLSP 300 to improve projection image quality.

A major benefit of laminated glass is its safety feature. ("Glass" as referred to anywhere in this disclosure may be silica-based or organic-based.) On impact, the glass fragments adhere to the interlayer, significantly reducing the risk of serious injury. This feature relies on two key material properties: adhesion to glass and strength of the interlayer itself. Liquid resin lamination has some advantages on these two key properties in comparing with interlayer lamination. First, an interlayer has limited mobility because it is a solid polymer, and has limited adhesion because it is a polymer and contains plasticizer. A liquid resin normally contains monomers or oligomers which have a great mobility as a liquid for full molecular contacts to the surface of glass, resulting in much higher adhesion in comparison to polymers. (It is similar to the adhesion difference between paint and tape for the same type of materials.) It is also easy and efficient to get better adhesion by adding some adhesion promoters, such as silanes, which are small coupling molecules to silica-based materials that normally react at a molecular level. Secondly, in order to have its bonding function, interlayer cannot have a high level of cross-links as otherwise it cannot melt at raised temperature. Although some plasticizers are added into interlayer to reduce lamination temperature, interlayer still cannot have a high level of cross-links, because plasticizers do not soften highly polymerized materials. A low level of cross links greatly limits interlayer strength, so that bulletproof glass normally needs another layer of plastic, such as polycarbonate layer, with a better strength to absorb the impact energy. Liquid resin can be selected to have any designed level of toughness and cross-links. So, an inter layer formed from liquid resin may have two functions: the adhesion function for combining two panels together, and the function of bearing an impact and absorbing impact energy. With such advantages, bulletproof glass panel or hurricane proof glass made by liquid resin lamination may have fewer layers or be thinner; therefore, their costs can be much lower.

Liquid resin lamination provides methods to make a variety of products. Properties of liquid resin and its polymer can be easily modified to meet many purposes. The same family of chemicals but with different molecules weights, such as monomer and oligomer, can be used to adjust viscosity. Different viscosities may be a better fit for different application methods for better production efficiency. Liquid resin may be designed to totally block UV by adding UV stable and absorber aromatic groups, such as a bisphenol A group. UV blocking feature may protect liquid crystal in NPD-LCD film and extend the lifetime of LRLSP products. Liquid resin may be also designed to be UV transparent or partially UV transparent, such as only blocking UVC but allowing UVA or UVB for plants to grow, or producing vitamin D for humans, by selectively using aliphatic and aromatic monomers or oligomers. A co-pending application (U.S. application Ser. No. 14/666,142) was filed by the present inventor on Mar. 23, 2015 disclosing and claiming methods and compositions related to, inter alia, UV blocking.

Bulletproof glass needs multilayers, usually more than five layers, and usually has a thickness of about 3 inches. A sequential lamination is normally used to make bulletproof glass. The sequential lamination adds one or two layers at a time until reaching designed multilayers. The sequential lamination process takes a long time, consumes a lot of energy and has a high cost. The liquid resin lamination process allows simultaneously filling up and laminating multilayers. If DayLightCure resin is used, the lamination process may be conducted at room temperature without a need of any heavy equipment. Avoiding multiple heating and cooling cycling with increased thickness may save a lot of energy: therefore, liquid resin laminated bulletproof glass or hurricane proof may have much lower cost compared to similar products made by interlayer lamination.

One of the advantages of liquid resin lamination is the capability to laminate tempered glass. Tempered glass is normally not flat. Bent tempered glasses have less parallelism and usually cannot be laminated with interlayer, because interlayer does not have large mobility to handle a large tolerance in flatness or parallelism. Liquid resin lamination may easily handle large tolerance in flatness or parallelism by its liquid mobility.

Glass 230 in the apparatus 300 may be different materials, such as acrylic and polycarbonate. Plastic panel is often called plastic glass and is used in interlayer lamination. Advantages of LRLSP with plastic materials are its light weight and bendability. Interlayer lamination with plastic layer(s) requires some special interlayers suitable for relatively lower lamination temperature. Many interlayer materials cannot be used for plastic lamination in an autoclave, because high lamination temperature may cause a permanent deformation of the plastic layers or panels. Liquid resin laminated switchable panel does not have such risks, because it is a room-temperature process. The combination of using glass and plastic layers is common in the structure of bulletproof glass and hurricane proof glass. Due to different thermal conductivity and inefficiency of heat transfer through thick and multilayer panels, it is even more difficult to make bulletproof or hurricane-proof glass. Manufacture requires an even slower heating and cooling process. The liquid resin lamination process at room temperature with daylight or natural light offers a great efficiency in production.

Although the present invention has been described with respect to specific details, it is not intended that such details should be regarded as limitations on the scope of the invention, except to the extent that they are included in the accompanying claims.

I claim:

1. A method for making a liquid resin laminated switchable panel, comprising:
   placing a switchable film selected from the group consisting of (i) a liquid crystal micro-droplet (LCMD) film, (ii) a suspended particle display (SPD) film, (iii) an electrochromic film, and (iv) a thermochromic film in a space between two layers of glass;
   placing a liquid resin in the space between the two layers of glass; and
   curing the liquid resin to create a bonded connection between the switchable film selected from the group consisting of (i) the LCMD film, (ii) the SPD film, (iii) the electrochromic film, and (iv) the thermochromic film, and at least one of the layers of glass to form the liquid resin laminated switchable panel.

2. The method of claim 1, wherein the switchable film comprises liquid crystal (LC) material.

3. The method of claim 1, wherein the liquid resin is an acrylic, urethane, silicone, polyester, epoxy or polysulfide resin.

4. The method of claim 1, wherein the step of placing a liquid resin between the layers of glass includes gravity filling, vacuum filling or pressure filling.

5. The method of claim 1, wherein the liquid resin is cured by exposing the liquid resin to daylight or ultraviolet light.

6. The method of claim 1, wherein the liquid resin is cured by application of heat.

7. The method of claim 1, further comprising the step of adding spacers into the liquid resin.

8. The method of claim 1, wherein the step of placing a liquid resin between the two layers of glass includes placing a seal at selected locations around the edges of the layers of glass before placing the liquid resin.

9. The method of claim 1, wherein the step of placing a liquid resin between the layers of glass includes providing an inlet fixture and an outlet conduit before placing the liquid resin.

10. The method of claim 1, wherein a dye or pigment is added into the liquid resin before the liquid resin is placed.

11. The method of claim 1, wherein the liquid resin is placed in the space between the layers of glass by a roller lamination process.

12. The method of claim 1, wherein adding the liquid resin in the space formed between the layers of glass comprises adding the liquid resin into a substantially sealed cavity formed between the switchable film and one of the layers of glass.

* * * * *